United States Patent
Trevathan et al.

(10) Patent No.: US 10,555,111 B2
(45) Date of Patent: Feb. 4, 2020

(54) PROCESSES AND SYSTEMS OF GEO-BOUNDARY MONITORING AND CACHING FOR MOBILE DEVICES

(71) Applicant: Kony Inc., Orlando, FL (US)

(72) Inventors: Matthew B. Trevathan, Roswell, GA (US); Matthew Terry, Celebration, FL (US); Muralidhar Seelam, Orlando, FL (US)

(73) Assignee: KONY, INC., Orlando, FL (US)

( * ) Notice: Subject to any disclaimer, the term of this patent is extended or adjusted under 35 U.S.C. 154(b) by 75 days.

(21) Appl. No.: 15/450,689

(22) Filed: Mar. 6, 2017

(65) Prior Publication Data

US 2018/0255425 A1  Sep. 6, 2018

(51) Int. Cl.
*H04W 4/021* (2018.01)
*H04L 29/08* (2006.01)
*H04W 4/02* (2018.01)

(52) U.S. Cl.
CPC ......... *H04W 4/021* (2013.01); *H04L 67/2842* (2013.01); *H04L 67/2857* (2013.01); *H04W 4/023* (2013.01)

(58) Field of Classification Search
CPC ..... H04W 4/021; H04W 4/023; H04W 4/027; G06F 17/3087; G06F 17/30457; H04L 67/2852; H04L 67/2842
See application file for complete search history.

(56) References Cited

U.S. PATENT DOCUMENTS

| | | | |
|---|---|---|---|
| 8,199,003 B2 | 6/2012 | Aaron | |
| 8,688,396 B2 | 4/2014 | Lin et al. | |
| 9,280,559 B1 | 3/2016 | Jones | |
| 9,392,408 B2 | 7/2016 | Johnson | |
| 9,491,588 B1 | 11/2016 | Biehl et al. | |
| 2009/0233623 A1 | 9/2009 | Johnson | |
| 2010/0069035 A1 | 3/2010 | Johnson | |
| 2012/0064921 A1 | 3/2012 | Hernoud et al. | |
| 2013/0262184 A1 | 10/2013 | Jain et al. | |
| 2013/0297422 A1 | 11/2013 | Hunter et al. | |
| 2013/0326137 A1* | 12/2013 | Bilange | G06F 12/0866 711/113 |
| 2013/0332236 A1 | 12/2013 | Kuppusamy | |
| 2013/0337789 A1 | 12/2013 | Johnson | |
| 2015/0031388 A1* | 1/2015 | Chatterjee | H04W 4/021 455/456.1 |

(Continued)

FOREIGN PATENT DOCUMENTS

WO  2015192895  12/2015

*Primary Examiner* — Margaret G Mastrodonato
(74) *Attorney, Agent, or Firm* — Andrew M. Calderon; Roberts Mlotkowski Safran Cole & Calderon P.C.

(57) ABSTRACT

The present disclosure generally relates to geo-boundary services for mobile devices and related applications and, more particularly, to systems and processes for providing a refresh boundary encompassing a plurality of geo-boundaries which can be monitored and cached by mobile devices and related applications. The method includes: obtaining a plurality of geographic boundaries from a geographic location of a mobile device; generating a monitored boundary encompassing the plurality of geographic boundaries; and providing a refresh boundary within the monitored boundary to encompass at least one geographic boundary of the plurality of geographic boundaries.

20 Claims, 8 Drawing Sheets

(56) References Cited

U.S. PATENT DOCUMENTS

| | | | |
|---|---|---|---|
| 2015/0106395 A1 | 4/2015 | Stafira et al. | |
| 2015/0149254 A1 | 5/2015 | Sakamoto | |
| 2015/0304341 A1 | 10/2015 | Son et al. | |
| 2015/0324851 A1 | 11/2015 | Campbell et al. | |
| 2015/0365246 A1 | 12/2015 | Kane | |
| 2016/0044583 A1* | 2/2016 | Bahram Pour | H04W 4/02 455/456.3 |
| 2016/0050530 A1 | 2/2016 | Corbalis et al. | |
| 2016/0119424 A1 | 4/2016 | Kane et al. | |
| 2016/0119770 A1 | 4/2016 | Ryu et al. | |
| 2016/0127863 A1 | 5/2016 | Yoon et al. | |
| 2016/0357782 A1 | 12/2016 | Jones | |
| 2016/0358432 A1 | 12/2016 | Branscomb et al. | |
| 2016/0360360 A1 | 12/2016 | Jones | |
| 2017/0078842 A1* | 3/2017 | Steger | H04W 4/021 |
| 2017/0337475 A1* | 11/2017 | DeLuca | H04W 4/021 |

\* cited by examiner

PROCESSES AND SYSTEMS OF GEO-BOUNDARY MONITORING AND CACHING FOR MOBILE DEVICES

FIELD OF THE INVENTION

The present disclosure generally relates to geo-boundary services for mobile devices and related applications and, more particularly, to systems and processes for providing a refresh boundary encompassing a plurality of geo-boundaries which can be monitored and cached by mobile devices and related applications.

BACKGROUND

Location based services allow for a rapid adoption and growth of mobile devices. This ability for a mobile device to know its location can be a primary or supporting feature of mobile applications available and used on the mobile device. For example, based on its location, a mobile device can encounter and interact with a beacon within a particular geographic location. With the mobile applications leveraging beacons and respective geographic boundaries ("geo-boundaries"), these mobile applications are starting to break the limits of how many geographic locations can be stored and monitored by a single device.

Currently, devices can monitor about 20 locations at one time. This limit of monitoring 20 locations can help preserve the battery and the processing power of the mobile device. However, users are starting to hit this limit more beacons and accompanying geo-boundaries are being deployed for commercial purposes. The push of location based services into the marketplace and the use of beacons and geo-boundaries to target end users for push messaging and application configuration can create problems. For example, a problem can arise when a user needs to update the list of available beacons with their respective locations and geo-boundaries while using the mobile device.

SUMMARY

In an aspect of the disclosure, a method comprises: obtaining a plurality of geographic boundaries from a geographic location of a mobile device; generating a monitored boundary encompassing the plurality of geographic boundaries; and providing a refresh boundary within the monitored boundary to encompass at least one geographic boundary of the plurality of geographic boundaries.

In an aspect of the disclosure, a computer program product for providing a refresh boundary, the computer program product comprises a computer readable storage medium having program instructions embodied therewith, the program instructions executable by a computing device to cause the computing device to: generate a list of geographic boundaries and associated beacons within a geographic area of a mobile device; form a monitored border encompassing the listed geographic boundaries and the associated beacons; rank the geographic boundaries and associated beacons based on distance from the mobile device and size of the geographic boundaries; and form the refresh boundary based on a number of the ranked geographic boundaries closest to the mobile device.

In an aspect of the disclosure, a system comprises a CPU, a computer readable memory and a computer readable storage medium associated with a computing device. The system further includes program instructions to: generate a monitored boundary encompassing a plurality of beacons and associated geo-boundaries within a predefined geographic area; and to form a refresh boundary which includes a predefined number of the plurality of beacons and associated geo-boundaries within the predefined geographic area. The refresh boundary is calculated by: obtaining a first distance between each geo-boundary and the mobile device in the monitored boundary; obtaining a second distance representing a radius of each geo-boundary associated with each respective beacon within the monitored boundary; calculating a difference between the first distance and second distance; ranking the differences from highest to lowest; and including a subset or entirety of the highest ranked differences within the refresh boundary based on a number of geo-boundaries which can be monitored by the mobile device.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
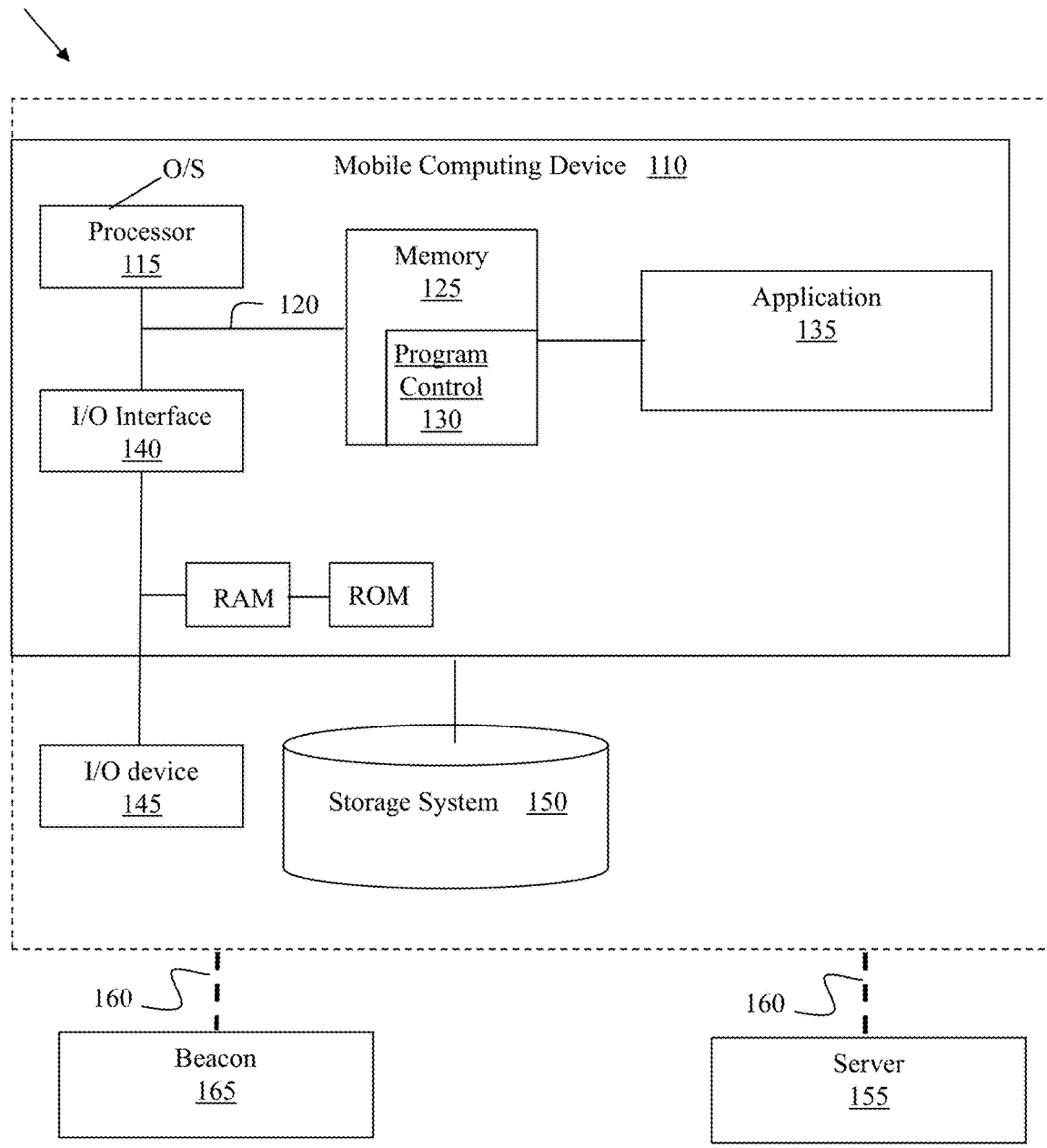
FIG. 1 shows an illustrative infrastructure for geo-boundary monitoring and caching in accordance with aspects of the invention.

The present disclosure generally relates to geo-boundary services for mobile devices and related applications and, more particularly, to systems and processes for providing a refresh boundary encompassing a plurality of geo-boundaries which can be monitored and cached by mobile devices and related applications. Advantageously, in embodiments, the systems and processes described herein provide refresh boundaries for mobile devices such that the mobile devices can leverage geo-boundaries and services within the geo-boundaries, while preserving resources of the mobile devices.

In more specific embodiments, the systems and processes described herein provide an approach for monitoring geo-boundaries by utilizing a refresh boundary with respect to the location of the mobile device. In embodiments, the refresh boundary is a boundary encompassing a plurality of geo-boundaries and, more specifically, encompassing a limited number of location points, e.g., beacons and their respective geographic location and accompanying boundaries, which can be monitored by the mobile device while still preserving its resources. The refresh boundary can be based on a variety of factors including, e.g., time, distance, signal strength and network traffic. By implementing the refresh boundaries described herein, it is now possible to monitor geo-boundaries while ignoring or deleting other geo-boundaries that do not need monitoring by the mobile device. In this way, the refresh boundary can encapsulate multiple internal geo-boundaries which can be monitored by the mobile device, while preserving resources on the mobile device.

To preserve the resources of the mobile device, in embodiments, the systems and processes can rank the geo-boundaries based on distance to the mobile device. Specifically, the ranking determines which geo-boundaries, if any, should be monitored within the refresh boundary by the mobile device based on distance away from the mobile device. In embodiments, this ranking can be based on the edges of the geo-boundaries, with the geo-boundaries having edges closest to the device being ranked higher than geo-boundaries having edges farther away from the mobile device. The closeness of the edges can be calculated by finding a first distance extending from the mobile device to a center of a respective geo-boundary. A second distance representing a radius from the center of the geo-boundary to an outer edge of the geo-boundary is also measured. The difference between these two distances determines the closeness of a geo-boundary edge with respect to the mobile device.

In further embodiments, the systems and processes described herein provide a mechanism for the mobile device to locally cache geo-boundaries within a specific region. In embodiments, this local cache can be a secondary cache mechanism to limit the number of calls to the server, while also allowing the mobile device to leverage the secondary cache for refreshing the monitored, level one cache, e.g., the current geo-boundaries and refresh boundary. For example, the first level of cache can handle the monitoring of specific location points within a current refresh boundary, while the second level of cache provides a larger cache of geo-boundaries encompassing a complete set of points near the user device within a predetermined distance. More specifically, in embodiments, the secondary cache can include an outer boundary of location points which encapsulate the monitored points within the refresh boundary and location points outside of the refresh boundary. And, by implementing the secondary cache, the mobile device can now refresh its geo-boundaries, without the need to call a server to determine the presence of geo-boundaries; instead, the mobile device can simply use the secondary cached location points to perform the refresh of the geo-boundaries. In this way, additional resources can be preserved, e.g., network bandwidth, battery power, etc.

In further embodiments, the systems and processes described herein can optimize the monitoring of geo-boundaries based on a trajectory of the mobile device, e.g., direction, movement and speed of the mobile device. For example, by providing details of the mobile device, e.g., the current location, speed and direction of travel (e.g., trajectory) of the mobile device, it is possible to optimize a list of geo-boundaries within the path of the mobile device, e.g., within an prediction zone. More specifically, the prediction zone will focus on location points that should be monitored within the trajectory of the mobile device, e.g., within a path of the mobile device, while ignoring location points which are not projected to be within the trajectory of the mobile device. By way of example, the prediction zone would not include location points which are behind a mobile device which is moving in a certain direction.

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in computer readable storage medium. The computer readable storage medium is not a transitory signal per se, and is any tangible medium that can contain and store the program for use by or in connection with an instruction execution system, apparatus, or device. For example, the computer readable storage medium can comprise electronic, magnetic, optical, electromagnetic, infrared, and/or semiconductor systems and/or devices. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

FIG. 1 shows a computer infrastructure 100 for generating refresh boundaries and for monitoring of geographic boundaries (geo-boundaries) within the refresh boundaries using a mobile device. The infrastructure 100 includes a computing device 110, which can be a mobile computing device such as a smartphone, tablet computer, personal digital assistant, or similar computing device that includes a mobile operating system, wireless communication antenna, processor, user interface, memory, etc. In embodiments, the infrastructure 100 can also be representative of a back end server, provided by a service provider.

The computing device 110 includes a processor 115 (e.g., CPU), a bus 120, memory 125, and an I/O interface 140. The memory 125 can include a local memory employed during actual execution of program code, bulk storage, and cache memories which provide temporary storage of at least some program code in order to reduce the number of times code must be retrieved from bulk storage during execution. In addition, the computing device 110 includes random access memory (RAM), a read-only memory (ROM), and an operating system (O/S).

The computing device 110 is in communication with external I/O device/resource 145 and storage system 150. For example, I/O device 145 can comprise any device that enables an individual to interact with the computing device 110 (e.g., a user interface such as a touch screen) or any device that enables computing device 110 to communicate with one or more other computing devices using any type of communications link. The external I/O device/resource 145 may be for example, a handset, keyboard etc.

The computing device 110 also interacts with one or more servers 155 and one or more beacons 165 through communication channel 160. The communication channel 160 can be a wireless channel, among other examples. For example, the communication channel 160 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the communication channel 160 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The server 155 can be, e.g., one or more servers. In embodiments, the server 155 can be representative of a mobile backend as a service (MBaaS), maintained by a service provider, e.g., Kony™. As should be understood by those of ordinary skill in the art, the MbaaS is a model for providing web and mobile application developers with a way to link their applications to backend cloud storage and APIs exposed by backend applications, while providing features such as user management, push notifications, and integration. In embodiments, the server 155 can also be representative of other types of business enterprise servers, accessible via cloud based applications. For example, the server 155 can be a single, open standards-based mobile infrastructure platform. In embodiments, the single, open standards-based mobile infrastructure platform can unify multiple infrastructures/platforms together, including mobile application development platform (MADP), mobile backend as a service (MBaaS), Application Programming Interface (API) management, and platform as-a-service (PaaS) infrastructures. To this end, for example, the server 155 can be representative of Kony™ MobileFabric™ which is a converged mobile infrastructure.

In embodiments, processor 115 executes computer program code (e.g., program control 130), which can be stored in memory 125 and/or storage system 150. While executing the computer program code, the processor 115 can read and/or write data to/from memory 125, storage system 150, and/or I/O interface 140. The bus 120 provides a communications link between each of the components in computing device 110. In accordance with aspects of the invention, program control 130 can also control the geo-boundary services application 135, which performs the processes and functions as described further herein.

In embodiments, the storage system 150 can be a primary cache and a secondary cache for storing locations of beacons 165 and related geo-boundaries of the beacons 165. For example, the storage system 150 can include a primary cache which stores a limited number of geo-boundaries used to create a current refresh boundary which is monitored by the mobile device 110. This limited number of geo-boundaries will include, e.g., a number of geo-boundaries which can be monitored by the computing device 110 within an allowable limit. The secondary cache, on the other hand, includes a larger number of geo-boundaries encompassing a complete set of points within a certain distance, e.g., 10 miles, of the computing device 110. In embodiments, the large number of geo-boundaries can include an outer boundary of location points which encapsulate the currently monitored points within the refresh boundary and location points outside of the refresh boundary. In this way, the computing device 110 can store a plurality of beacon 165 locations and associated geo-boundaries for refreshing of the boundaries, e.g., interchange with currently monitored points, without the need to call the server 155, e.g., if the computing device is offline.

In embodiments, the geo-boundary services application 135 allows the computing device 110 to interact with the server 155 and also with the beacons 165. For example, the geo-boundary services application 135 can be a mobile application that allows the server 155 and beacons 165 to be recognized and to facilitate interactions between the computing device 110 and the server 155 and beacons 165 as described herein. The geo-boundary services application 135 can be implemented as one or more program codes in program control 130 stored in memory 125 as separate or combined modules. In additional embodiments, the geo-boundary services application 135 can be resident on either or both of the computing device 110 and the server 155. In this way, the features described herein can provide additional flexibility, particularly to mobile devices 110 that have not uploaded the geo-boundary services application 135.

In specific embodiments, the geo-boundary services application 135 can generate or create refresh boundaries for the computing device 110, e.g., mobile device 110. The refresh boundaries, for example, can include a limited number of geo-boundaries (beacons 165 and associated boundaries) which can be monitored by the computing device 110. By way of more specific example, the refresh boundary can encapsulate multiple internal boundaries of geo-locations within a specific area surrounding the computing device 110. In embodiments, the refresh boundaries can be dynamically calculated or adjusted based on a number of different factors including, e.g., network traffic, resources of the computing device 110, etc., as further described herein. In embodiments, the refresh boundaries can be based on the limited amount of resources of the mobile device 110, as either requested by the mobile device 110 or known by the server 155. The refresh boundaries can also be based on not only a number of geo-locations but also a distance of the geo-locations or points of interest (e.g., beacons 165) are from the mobile device 110, or a number of geo-locations requested by the mobile device 110, amongst other possibilities.

By way of example, the refresh boundary can encompass a limited number of geo-locations, e.g., beacons 165, which can be monitored by the computing device 110. The refresh boundary can be refreshed from time to time, based on a number of geo-boundaries within a specific area surrounding the mobile device 110 by either calling to the server 155 or obtaining new geo-boundaries within the internal, secondary cache, e.g., storage system 150. This allows two levels of caching of points, i.e., the first level of cache handles monitoring points and the second level of cache provides a cache of boundaries in case the user cannot connect to the back end server 155 to do a refresh or the developer wants to minimize calls to the notification server to retrieve points for performance reasons.

In embodiments, the refresh boundary can be refreshed from time to time, based on a request from the mobile device 110 or other factors. For example, in embodiments, the refresh boundary can be either pulled from the server 155 (though a request by the mobile device 110) or pushed automatically to the mobile device 110. In the push application, the server 155 can automatically refresh the boundary based on a location of the mobile device 110 (as provided by the mobile device 110 or third party service provider) as it relates to the current refresh boundary and number of geo-boundaries within the current refresh boundary. In embodiments, the current refresh boundary which includes a number of monitored locations can be automatically refreshed prior to the mobile device 110 exiting a monitored area.

In embodiments, the geo-boundary services application 135 can use a fitting algorithm to create the refresh boundaries and the monitoring of a limited number of geo-boundaries within a specific location, while preserving the internal resources of the mobile device 110. The fitting algorithm can be adjusted to fit the user's needs, e.g., based on a user's demand for a predetermined number of geo-boundaries to be monitored. For example, the user can note that the mobile device 110 is limited to only a predetermined number, e.g., 20, of geo-locations that can be implemented with the mobile device 110. In this way, the fitting algorithm will generate the refresh boundary based on the number of geo-boundaries that can be monitored and accommodated by the computing device 110.

In embodiments, the fitting algorithm can include, e.g., obtaining the total distance between the computing device 110 and a center of each geo-boundary nearest to the computing device 110 (D1), obtaining an outer edge of the geo-boundary closest to the computing device (D2)), and calculating the difference between D1 and D2 to find the closest edges of each geo-boundary. Once this is found, the application 135 can rank the geo-boundaries for which geo-boundaries should be monitored. As an example, if the computing device 110 can only monitor ten geo-boundaries, then the closest boundaries will be taken and a refresh boundary will automatically refresh. For a more specific example, if only five geo-boundaries are to be monitored, then the computing device 110, e.g., application 135, can rank the four closest edges to the computing device 110 and create a refresh boundary that slightly overlaps the outer-most geo-boundary.

In additional embodiments, the geo-boundary services application 135 can provide a "Monitored Boundary", which includes the refresh boundary and a plurality of other geo-boundaries. For example, the geo-boundary services application 135 can make a request to the server 155 and submit its current location and the number of geo-boundaries and beacons 165 it can effectively monitor. The server 155 (or geo-boundary services application 135) identifies the "List of Boundaries and Beacons" by calculating the closest geo-boundaries and beacons 165 based on the provided inputs. The server 155 (or geo-boundary services application 135) generates the "Monitored Boundary" by creating the smallest geo-boundary possible that includes all boundaries and beacons 165 in the "List of Boundaries and Beacons". The "Refresh Boundary" is then calculated as a smaller geo-boundary circle than the "Monitored Boundary." For example, the server 155 (or geo-boundary services application 135) can subtract '1' from the number of geo-boundaries to make room for the "Refresh Boundary".

The geo-boundary services application 135 can also provide a "Refresh Frequency". In embodiments, a "Refresh Frequency" can be a predetermined value, e.g., 50%, for the size of the "Refresh Boundary" compared to the "Monitored Boundary". This predetermined value provides a reasonable size that balances the need to reduce the number of calls back to the server 155 for a new set of boundaries and for avoiding the risk of not refreshing often enough. However, the geo-boundary services application 135 may choose to reduce or increase the "Refresh Frequency" percentage based on a number of factors. As should be understood, increasing this value creates a larger "Refresh Boundary" inside the "Monitored Boundary" and reduces the number of times the geo-boundary services application 135 would refresh the list as the computing device 110 is in motion. If, on the other hand, the geo-boundary services application 135 reduces the "Refresh Frequency" percentage, the "Refresh Boundary" will be smaller inside the "Monitored Boundary" which causes the list to be refreshed more frequently as the computing device 110 is in motion.

Moreover, the geo-boundary services application 135 can provide a predicted optimized refresh boundary, e.g., "Trajectory Optimized". In this implementation, the server 155 or the computing device 110 can optimize the list of geo-boundaries by using the trajectory, e.g., direction and speed, of the mobile device 110. For example, if the computing device 110 is moving at 70 mph, it is not useful to monitor boundaries the user is currently moving away from; instead, the boundary services application 135 residing on either the server 155 or the computing device 110 can create a "Prediction Zone" (predicted optimized refresh boundary) based on the user's speed and trajectory. In embodiments, the width of the zone can be decreased as the user's speed increases in a specific direction. For example, if a user is on a bicycle moving at 2 mph, the zone will still mostly resemble a circle, but if the user is moving in a fairly straight line, the zone could be reduced to a 30 degree angle or other angle as described further herein.

The geo-boundary services application 135 can further provide "Boundary Actions". For example, in this implementation, the geo-boundary services application 135, e.g., server 155, can provide a set of meta data with each geo-boundary and beacon 165 which instructs a certain action to be taken by the computing device 110. In embodiments, the "Boundary Actions" can be based on either a push or pull approach. Illustratively, a certain geo-boundary may have an alert associated with it that is intended for any users entering the boundary, e.g., "Local Notification". For example, a message, e.g., "20% off all Jeans Today Only", can be pushed to the mobile device 110 as it enters a geo-boundary around a specific store location. The advantage of including the action and message along with the Geo-boundary and Beacon list is that the mobile device 110 can immediately notify the user without any delay in contacting the server 155, which would be useless if the user has lost their data connection.

Other actions implemented by the geo-boundary services application 135 can include, e.g., "Report User Location". In this implementation, the geo-boundary services application 135 can simply report back to the server 155 the user's current location in order to trigger some backend process such as tracking how often a user has entered a store in a single month. Another action could be, e.g., "Refresh Boundaries" which would typically be the action on the Refresh Boundary. Another action could be a "Server Notification" which would invoke an API to the server 155 with the Geo-boundary ID to retrieve the latest message for that geo-boundary. Other actions could be specific to the application logic such as "Unlock Level 2" where the user's physical presence in a specific geo-boundary will unlock certain features in the geo-boundary services application 135.

FIGS. 2-5 show illustrative flowcharts and environments implementing aspects of the present invention. The steps and functions of FIGS. 2-5 may be implemented in the environment of FIG. 1, for example. As noted herein, the flowcharts illustrate the architecture, functionality, and operation of possible implementations of systems, methods, and computer program products according to various embodiments of the present invention.

Figure 2:
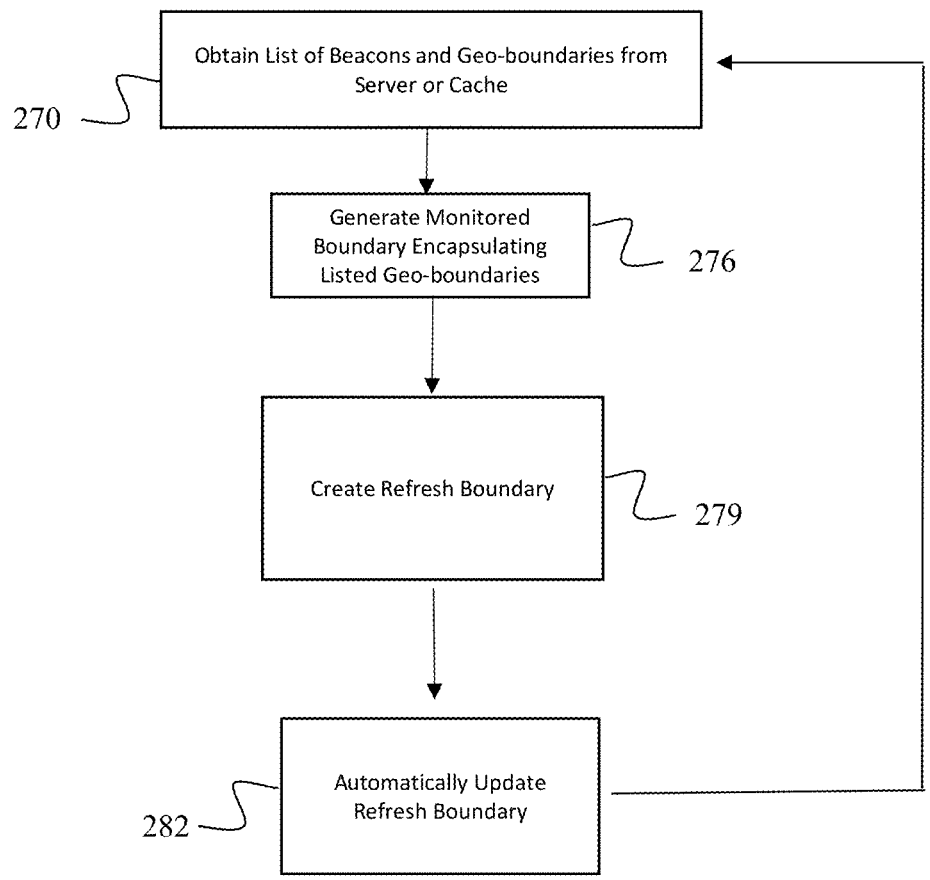
FIG. 2 shows an illustrative process for creating a refresh boundary within a monitored boundary in accordance with aspects of the invention.

More specifically, FIG. 2 illustrates a process for generating a refresh boundary within a monitored geo-boundary of a geographic area in accordance with aspects of the present invention. Initially, at step 270, the geo-boundary services application 135 requests a list of beacons 165 within a specific geographic area. This specific geographic area can be a predefined radius about a mobile device 110, for example, or a set number of beacons 165 which are requested by the mobile device 110, as another example. In embodiments, the list of beacons 165 can be obtained from either the server 155 (upon a request from the mobile device 110) or the primary and/or second caches of the storage system 150 of the mobile device 110. In this latter approach, the mobile device 110 need not call back to the server 155, hence saving considerable resources in network traffic, amongst other features. In either scenario, the monitored boundary will encapsulate all of the geo-boundaries provided on the list from the server 155 or the storage system (e.g., caches) 150.

At step 276, the process generates a monitored boundary encapsulating the listed geo-boundaries, i.e., monitored boundary that encompasses a region of interest for monitoring by the mobile device 110. This monitored boundary includes all of the beacons 165 and their associated geo-boundaries within a predefined area of interest. At step 279, the process creates a refresh boundary, which encompasses specific beacons 165 and associated geo-boundaries of the beacons 165 from within the monitored boundary. For example, the refresh boundary will be a subset of the monitored boundary, and will include a limited number of specific points of interest, e.g., beacons 165 and associated geo-boundaries, which are set, e.g., by the mobile device 110. For example, the limited number of specific points of interest can include any number of beacons 165 and associated geo-boundaries which are capable of being monitored by the mobile device 110, e.g., 10 locations.

In embodiments, the refresh boundary can be calculated by obtaining a distance D1, which represents a distance between the mobile device 110 and the center of each geo-boundary, e.g., the beacon 165, within the monitored boundary, e.g., region of interest. A second distance, D2 is calculated, which represents a distance of an outer edge of a geo-boundary of each beacon 165. Generally, the geo-boundary is circular and, hence, D2 is the radius of the geo-boundary. To find which geo-boundaries are closest edge-wise to the mobile device 110, the difference between D1 and D2 is calculated. Each geo-boundary within the region of interest is then ranked by edge closeness to the mobile device 110, with the geo-boundaries having an edge closer to the mobile device 110 being ranked higher than geo-boundaries have edges farther away.

This ranking determines which geo-boundaries in the region of interest should be within the refresh boundary. For example, the five closest ranked geo-boundaries can be included in the refresh boundary, while the remaining geo-boundaries will remain within the monitored region to possibly be included in the refresh boundary at a later time, i.e., depending on the location of the mobile device 110. Accordingly, by generating a refresh boundary, geo-boundaries closest to the mobile device 110 can be monitored while other geo-boundaries within the monitored boundary can be ignored. This allows for the mobile device 110 to focus on a smaller number of geo-boundaries, which can preserve the resources of the mobile device.

In embodiments, the geographic boundary ranked lowest at an outermost boundary in the refresh boundary will be used to automatically refresh the refresh boundary, upon the mobile device entering into or passing beyond its geo-boundary. A lowest ranked point or geographic boundary within the monitored boundary can also be used to generate a new monitored boundary, prior to the mobile device entering or passing beyond its geo-boundary.

At step 282, the refresh boundary can be automatically updated in accordance with aspects of the invention. For example, as the mobile device changes location within the region of interest, e.g., monitored boundary, the geo-boundaries can be ranked again, with the closest edge wise geo-boundaries remaining within or being updated within the refresh boundary. Hence, as the mobile device 110 moves near a farther ranked geo-boundary, the process 270 repeats itself so that geo-boundary services application 135 can constantly monitor and update geo-boundaries within the refresh boundary, without the need to call back to the server 155. In embodiments, the automatic update is referred to as the refresh frequency which ensures that the refresh boundary can always be refreshed with geo-boundaries within a monitored boundary.

Figure 3:
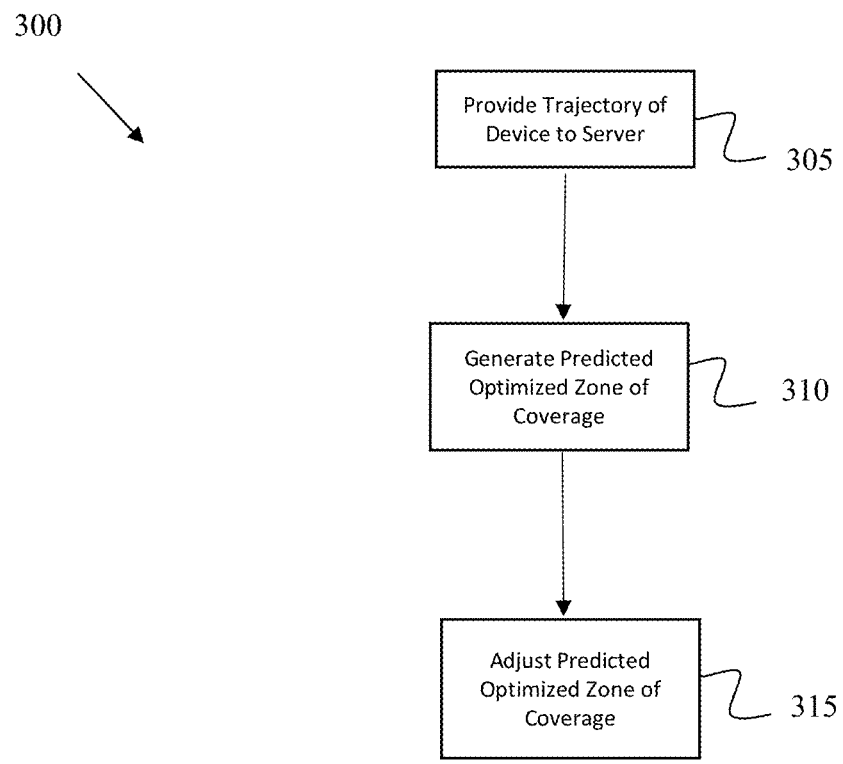
FIG. 3 shows an illustrative process for optimizing geo-boundaries and, if applicable, refresh boundaries within a geographic area in accordance with aspects of the invention.

FIG. 3 illustrates a process for optimizing geo-boundaries and, if applicable, refresh boundaries within a geographic area in accordance with aspects of the invention. More specifically, the process 300 determines which geo-boundaries should be monitored when the computing device 110 is traveling in a certain direction. In embodiments, the process 300 of FIG. 3 is provided after at least a monitored boundary is established in accordance with the steps of FIG. 2, for example.

Initially, at step 305, a speed and direction of the mobile device 110 is obtained by the server 155. In embodiments, the speed and location of the mobile device 110 can be obtained from a third party service provider or from the mobile device 110, directly. In embodiments, the speed and direction of the mobile device 110 is translated into a trajectory of the mobile device 110. Based on the trajectory information, at step 310, a predicted optimized zone (e.g., "prediction zone") of coverage, i.e., optimized list of geo-boundaries, is generated, which may be within a predicted path of travel of the mobile device 110. That is, the predicted optimized zone of coverage will include geo-boundaries and associated beacons 165 to be monitored by the mobile device 110 as it approaches these geo-boundaries and associated beacons 165. Additionally, at step 315, depending on the trajectory of the mobile device 110, e.g., speed and direction of travel, the size and/or shape of the predicted optimized zone of coverage can be changed. For example, the predicted optimized zone of coverage can be become narrower and longer as the speed of the mobile device 110 increases.

By way of example, if the mobile device 110 is moving at 50 mph, it would not be not useful to monitor boundaries which are behind the mobile device 110 or locations in which the user is moving away from. Instead, the server 155 can create a predicted optimized zone of coverage based on the speed and trajectory of the mobile device 110. The width of the predicted optimized zone of coverage is decreased as the user's speed increases in a specific direction; whereas, the width of the predicted optimized zone of coverage is increased as the user's speed decreases in a specific direction. For example, a mobile device 110 moving at 2 mph may have predicted optimized zone of coverage resembling a circle, whereas, when the mobile device is moving in a fairly straight line and at a higher rate of speed, the predicted optimized zone of coverage could be reduced to a 30 degree angle, with the predicted optimized zone of coverage being within the monitored boundary.

Figure 4:
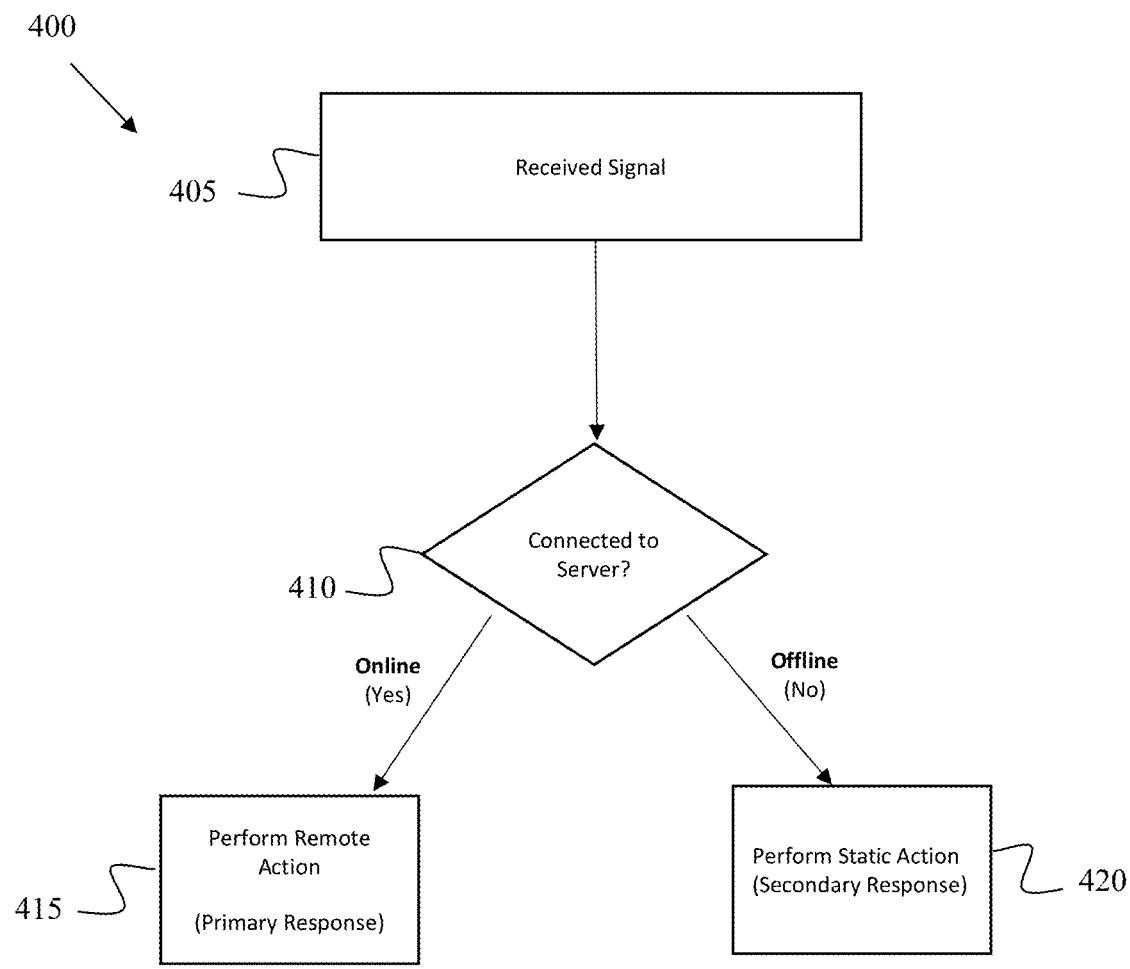
FIG. 4 shows an illustrative process of geo-boundary monitoring in accordance with aspects of the invention.

FIG. 4 illustrates a geo-boundary monitoring and caching process 400 in accordance with aspects of the invention. Specifically, at step 405, a signal is received from a beacon 165 within the refresh boundary. At step 410, a determination is made as to whether the mobile device 110 is in communication with a server, e.g., server 155. If the mobile device 110 is online, e.g., in communication with the server 155, at step 415, the signal received from the beacon 165 can be used to execute a remote action (also referred to as a boundary action). That is, the mobile device 110 can request an action from the server 155 to be performed by either the mobile device 110 or a back end service.

In embodiments, as the mobile device 110 is in communication with the server 155, the remote action can be a dynamic action, e.g., can change based on different illustrative scenarios. For example, the remote action can change based on time of day, distance between the beacon 165 and the mobile device 110, owner of the mobile device 110, amongst other possibilities. In any scenario, the mobile device 110 or back end service can execute such remote action based on the interaction with a geo-boundary, e.g., signal received from a particular beacon 165.

In embodiments, the remote action can be, e.g., an alert or other action to be taken by the mobile device 110 or back end service. More specifically, the remote action can trigger a backend process such as track how often a user has entered a particular geo-boundary within a set period of time, e.g., one month. As another example, the remote action can be a request to refresh the boundary, a "server notification" which invokes an API to the server 155 along with a geo-boundary ID to retrieve a latest message for that geo-boundary (e.g., "Server Notification"), or other logic of the geo-boundary services application 135, e.g., an "unlock action" where the user's physical presence in a specific geo-boundary can unlock certain features of the mobile device 110 or the mobile geo-boundary services application 135. In additional embodiments, the remote action can instruct the mobile device 110 to provide its location (e.g., "Report User Location") which, in turn, can be used to refresh the boundary.

Also, by being connected to the server 155, the server 155 can provide metadata to the beacon 165 of interest, or directly to the mobile device 110. In embodiments, the metadata can instruct the mobile action to take a specific action. For example, the action could be "local notification" when the mobile device 110 enters a certain geo-boundary around a specific store location. In addition or alternative, the action can be an both an action and message along with a list of geo-boundaries, which would advantageously notify the user of the mobile device 110, without any delay, to contacting the server 155 or perform some other action.

In comparison, if the mobile device 110 is offline, e.g., the mobile device 110 is not connected to the server 155, the action is then a static action, as shown in step 420. For example, the static action can be an action that is already stored on the mobile device 110. This static action can be a rule based action which is stored within the cache of the mobile device 110. For example, the static action can be an auto triggering feature which, upon execution, allows the mobile device 110 to the retrieve certain information from a certain geographic location or beacon 165. Other rule based static actions can include, for example, advertisement information or obtaining metadata of a particular beacon 165 which transmitted the signal to the mobile device 110, auto-updating location information, etc.

FIGS. 5A-5D illustrate several examples of providing refresh boundaries and other features and functionality associated with aspects of the invention. As should be understood by those of skill in the art, the illustrative examples shown in FIGS. 5A-5D may be implemented with the environment of FIG. 1, for example. The examples provided herein illustrate the architecture, functionality, and operation of possible implementations of systems, methods, and computer program products according to various embodiments of the present invention.

Figure 5A:
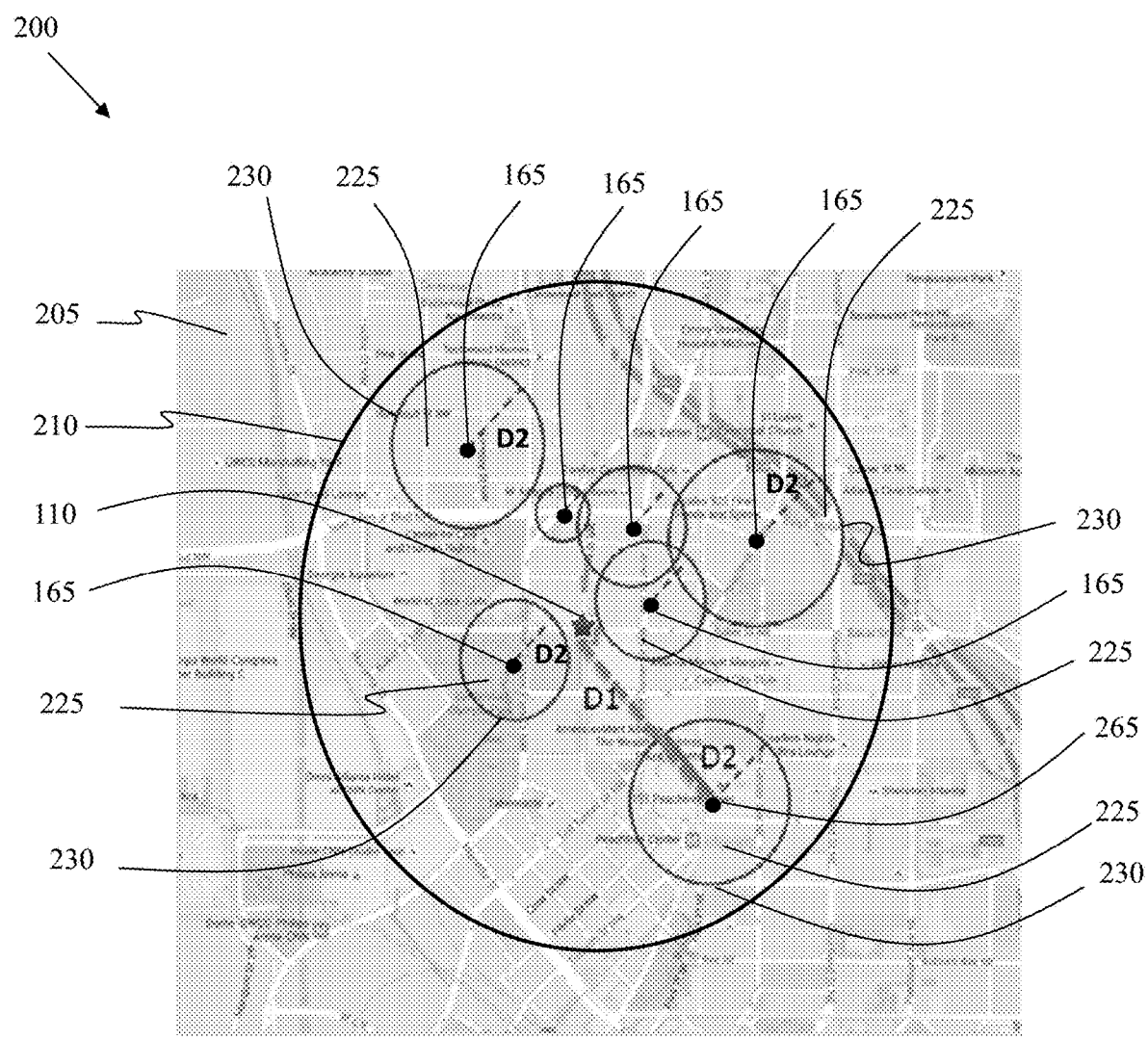
FIG. 5A shows a monitored boundary within a geographic area of a geographic environment in accordance with aspects of the invention.

More specifically, FIG. 5A illustrates a monitored boundary 210 within a geographic area 205 of a geographic environment 200. The geographic area 205 can be a city, town, or a neighborhood, among other geographic settings. In embodiments, the monitored boundary 210 is formed within the geographic area 205 and represents a region surrounding a mobile device 110 (e.g., computing device 110). For example, in embodiments, the monitored boundary 210 illustrates a region of interest for geo-boundaries of any appropriate size within the vicinity of the mobile device 110. As an example, the monitored boundary 210 can have a radius of three miles with the mobile device 110 being at a center of the monitored boundary 210, among other examples.

As should be understood by those of skill in the art, the monitored boundary 210 encompasses various beacons 165 located within the geographic area 205. These beacons 165 can be iBeacons which transmit information within the geographic boundary 225 (e.g., geo-boundary 230 surrounding each of the beacons 165). Additionally, the geo-boundary 230 can signify a latitudinal and longitudinal space plus a radius. More specifically, even with a beacon 165, the latitudinal and longitudinal coordinates of the geo-boundary 230 are desirable for the calculation of distances with respect to the mobile device 110. As should be understood by those of ordinary skill in the art, iBeacon™ allows Mobile Applications (running on both iOS and Android devices) to listen for signals from beacons 165 in the physical world and react accordingly. The underlying communication technology is Bluetooth Low Energy, as an example.

In embodiments, the geographic boundary 230 will be the range or boundary that the beacon 165 can transmit its signal. As should be understood by those of ordinary skill in the art, the signal can contain various forms of metadata. For example, metadata can include an instruction for execution of an action by the computing device 110 e.g., an alert for a particular action to be taken. Metadata can also include advertisements or other data associated with a particular location or owner of the beacon 165. As an example, metadata can include an offer of 10% off store merchandise, or a greater discount of 20% as the computing device enters a particular geo-boundary 230 associated with the same retailer.

To obtain the monitored boundary 210, for example, the geo-boundary services application 135 can make a request to the server 155 and submit its current location and the number of geo-boundaries 230 and beacons 165 it can effectively monitor, e.g., the geo-boundary services application 135 can make a request to the server 155 for a list of geo-boundaries 230 within the geographic area 205. The request can take any number of forms and can contain various information including the number of geo-boundaries 230 which can be accommodated by the limited resources of the mobile device 110, the number of beacons 165 it can monitor within a certain radius of the mobile device 110, the types of actions which should be received or taken with respect to the mobile device 110 at certain locations, etc.

Upon receiving the request, a response is generated by the server 155 and, more particularly, the geo-boundary services application 135. The response includes a list of beacons 165 along with the accompanying geographic locations 225 and geo-boundaries 230 within a certain, predefined area surrounding the mobile device 110. As an example, the list provided by the server 155 (geo-boundary services application 135) can include seven beacons 165, and therefore seven geographic locations 225 and seven geo-boundaries 230 as shown in FIGS. 5A-5D. In embodiments, the server 155 (or geo-boundary services application 135) can identify the "List of Boundaries and Beacons" by calculating the closest geo-boundaries 230 and beacons 165 based on the provided inputs, and using this information, it can create the smallest geo-boundary possible that includes all boundaries and beacons 165 in the "List of Boundaries and Beacons".

In embodiments, the total number of beacons 165 listed might not match the number requested by the mobile device 110. More specifically, the number of geo-boundaries 230 provided by the server 155 can be less than the number requested because of a need to accommodate a refresh boundary 235, shown in FIG. 5B, for example.

Figure 5B:
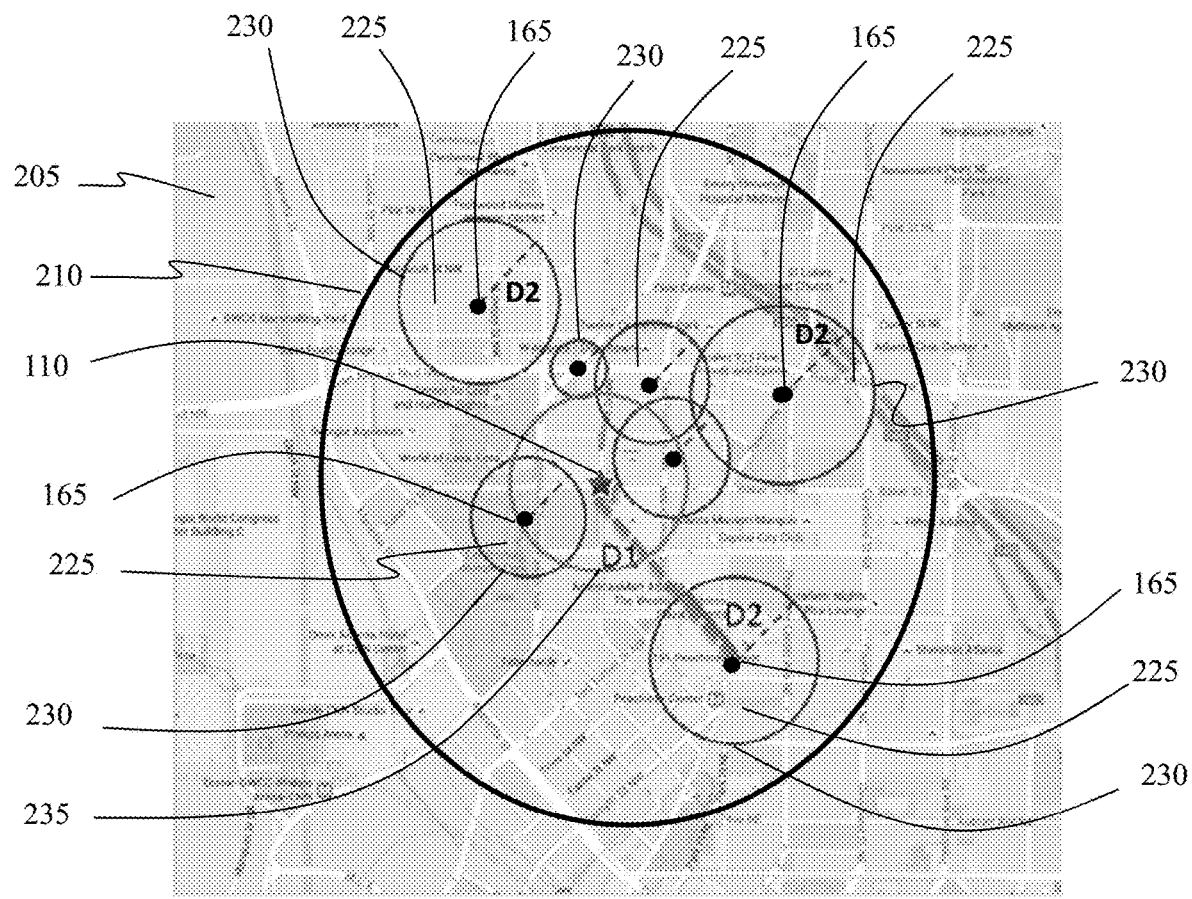
FIG. 5B shows a refresh boundary within the monitored boundary in accordance with aspects of the invention.

Referring to FIG. 5B, the refresh boundary 235 created by the geo-boundary services application 135 is within the monitored boundary 210. In embodiments, the refresh boundary 235 includes a number of geo-boundaries 230 within the monitored area 210, which may be matched to the limited, available resource of the mobile device 110. In embodiments, the refresh boundary 235 is smaller than the monitored boundary 210, allowing the geo-boundary services application 135 to monitor geo-boundaries 230 without the need to call back to the server 155. By reducing the amount of calls to the server 155, resources of the computing device 110, such as the battery, can be preserved.

The refresh boundary 235 can be calculated based on the geo-boundaries 230 present in the geographic area 205. As shown in FIG. 5B, for example, the refresh boundary 235 may be calculated by determining a first distance D1 which represents a total distance between the computing device 110 and a center of each of the geo-boundaries 230 and a second distance, D2, which represents an edge of the geo-boundary 230 closest to the computing device 110. Since most geo-boundaries 230 are circular, D2 can be easily obtained from the geo-boundary 230; that is, the value of D2 can be the radius of the geo-boundary 230 closest to the mobile device 110. To calculate the refresh boundary 235, the difference between D1 and D2 is calculated to find a distance of the edges of each geo-boundary 230 with respect to the computing device 110. This calculation of the difference between D1 and D2 is performed for all geo-boundaries 230 with a region of interest, e.g., the monitored boundary 210.

Based on the calculated edge distance, the various geo-boundaries 230 can be ranked, with the geo-boundaries 230 having an edge closer to the computing device 110 being ranked higher than a geo-boundary 230 with an edge further away from the computing device 110. In an example where only ten geo-boundaries 230 can be monitored within the refresh boundary 235, for example, the closest nine geo-boundaries 230 edge-wise with respect to the computing device 110 are ranked in order of closeness, while one space is left free for the newly generated refresh boundary 235.

Figure 5C:
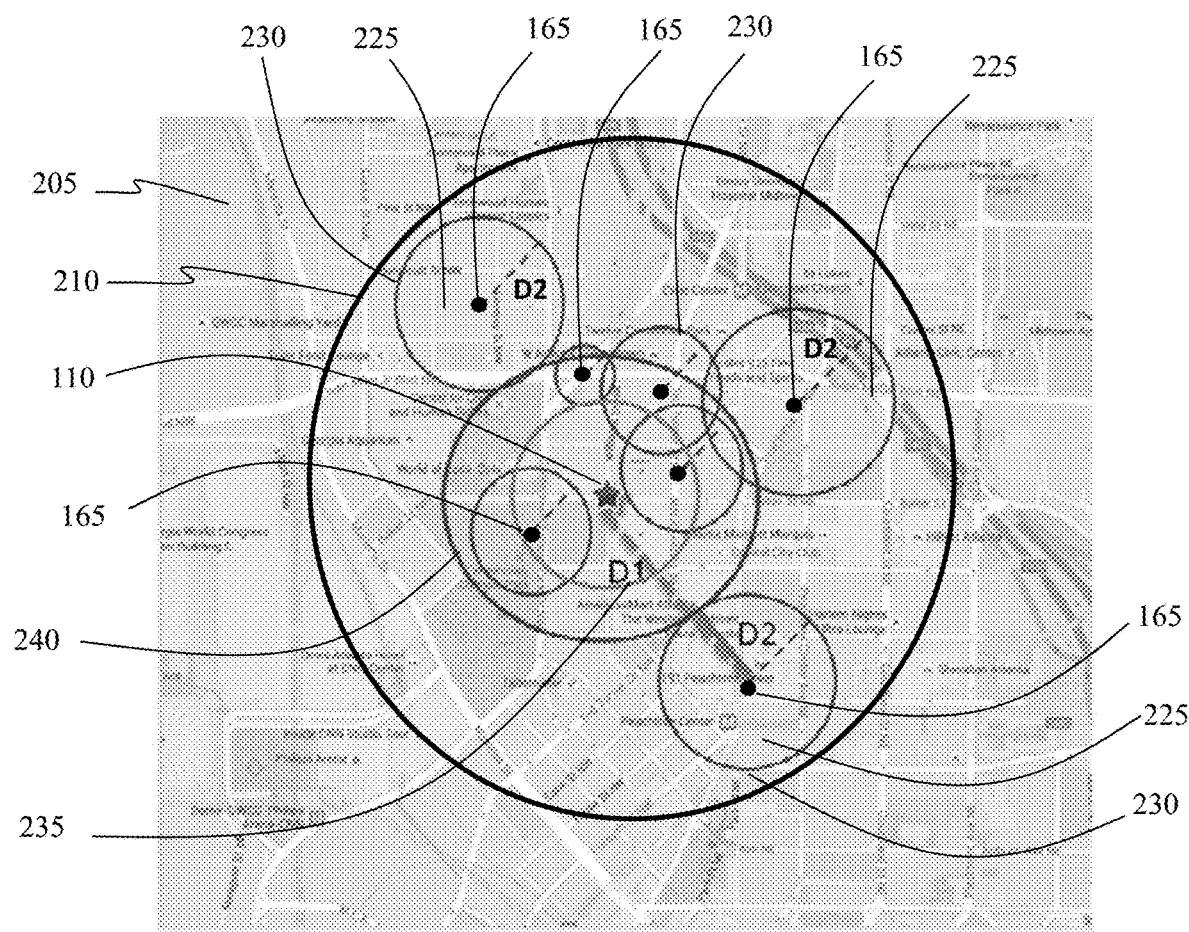
FIG. 5C shows a cached boundary encapsulating the refresh boundary in accordance with aspects of the invention.

As shown in FIG. 5C, the refresh boundary 235 slightly overlaps the outermost geo-boundary 230. In this way, as a user crosses the refresh boundary 235, the geo-boundary services application 135 can retrieve geo-boundaries 230 with respect to the new location of the computing device 110. More specifically, once the user crosses the refresh boundary 235, geo-boundary services application 135 can make a request to the MobileFabric™ (server 155) to retrieve geo-boundaries 230 near the mobile device 110 and repeat the process of creating a new refresh boundary 235. Further, the process of creating a new refresh boundary 235 in the new location can be repeated, e.g., the refresh boundary 235 can be automatically refreshed. For example, the refresh boundary 235 can refresh at an outer-most geo-boundary 230, e.g., outer-most with respect to the other ranked geo-boundaries 230 so that the computing device 110 will not miss a geo-boundary 230 near the user while outside the current refresh boundary 235. Accordingly, the refresh boundary 235 provides an approach for monitoring geo-boundaries 230 by maintaining and/or retrieving new geo-boundaries 230 while expelling geo-boundaries 230 which no longer need to be monitored, e.g., geo-boundaries 230 which are ranked lowest or not ranked at because they are the farthest edge-wise from the computing device 110.

The refresh boundary 235 can be based on a number of factors such as, for example, time, distance, signal strength of the beacon 165 and network traffic, among other factors. Additionally, the refresh boundary 235 can include a refresh frequency, which represents how often a refresh boundary 235 is and/or should be refreshed. Typically, the refresh frequency is a value of about 50% for the size of the refresh boundary 235 in comparison to the monitored boundary 210. This provides for a reasonable size that balances the need to reduce the number of calls back to the server 155 for a new list of geo-boundaries 230 while also avoiding the risk of not refreshing the refresh boundary 235 often enough. The user may choose to reduce or increase the value of the refresh frequency percentage as already described herein.

The computing device 110 can also locally cache geo-boundaries 230 within a geographic area 205, e.g., monitored boundary 210, when obtaining the list from the server 155. By having this feature, the computing device 110 does not need to always call the server 155. Instead, the computing device 115 can simply use the cached points of geo-boundaries 230 to perform the refresh. Again by reducing the calls back to the server 155, the resources of the computing device 110 can be preserved.

In embodiments, the caching can involve two levels of caching. The first level of cache handles the monitoring points, e.g., the geo-boundaries 230 which are currently being monitored in the monitored boundary 210 or the refresh boundary 235, and the second level of cache provides a cache of geo-boundaries 230 in case the user cannot connect to the server 155 to perform a refresh, or the developer wants to minimize calls to the server 155 for performance reasons. Therefore, the secondary cache mechanism can serve to limit the number of calls to the server 155. Also, this secondary cache can act as a larger refresh cache to retrieve a complete set of points near the user. More specifically, the computing device 110 can leverage the second level cache for refreshing the monitored, first level cache.

As illustrated in FIG. 5C, an outer cache boundary 240 encapsulates the refresh boundary 235 and the cached points, e.g. all the geo-boundaries 230 encapsulated by the outer cache boundary 240. The refresh boundary 235 encapsulates a certain number of geo-boundaries 230 that are being monitored, while the outer cache boundary 240 encapsulates the refresh boundary 235, the monitored geo-boundaries 230, and additional geo-boundaries 230 which are not being monitored. The geo-boundaries 230 which are being monitored and not being monitored can be interchanged, thereby eliminating a need to call back to the server 155. Similar to the refresh boundary 235, the outer cache boundary 240 uses the same processes for caching location points used for the monitoring of points and the refresh boundary 235. However, the outer cache boundary 240 generally caches a larger number of points of geo-boundaries 230 in comparison to the monitoring and the refresh boundaries.

Figure 5D:
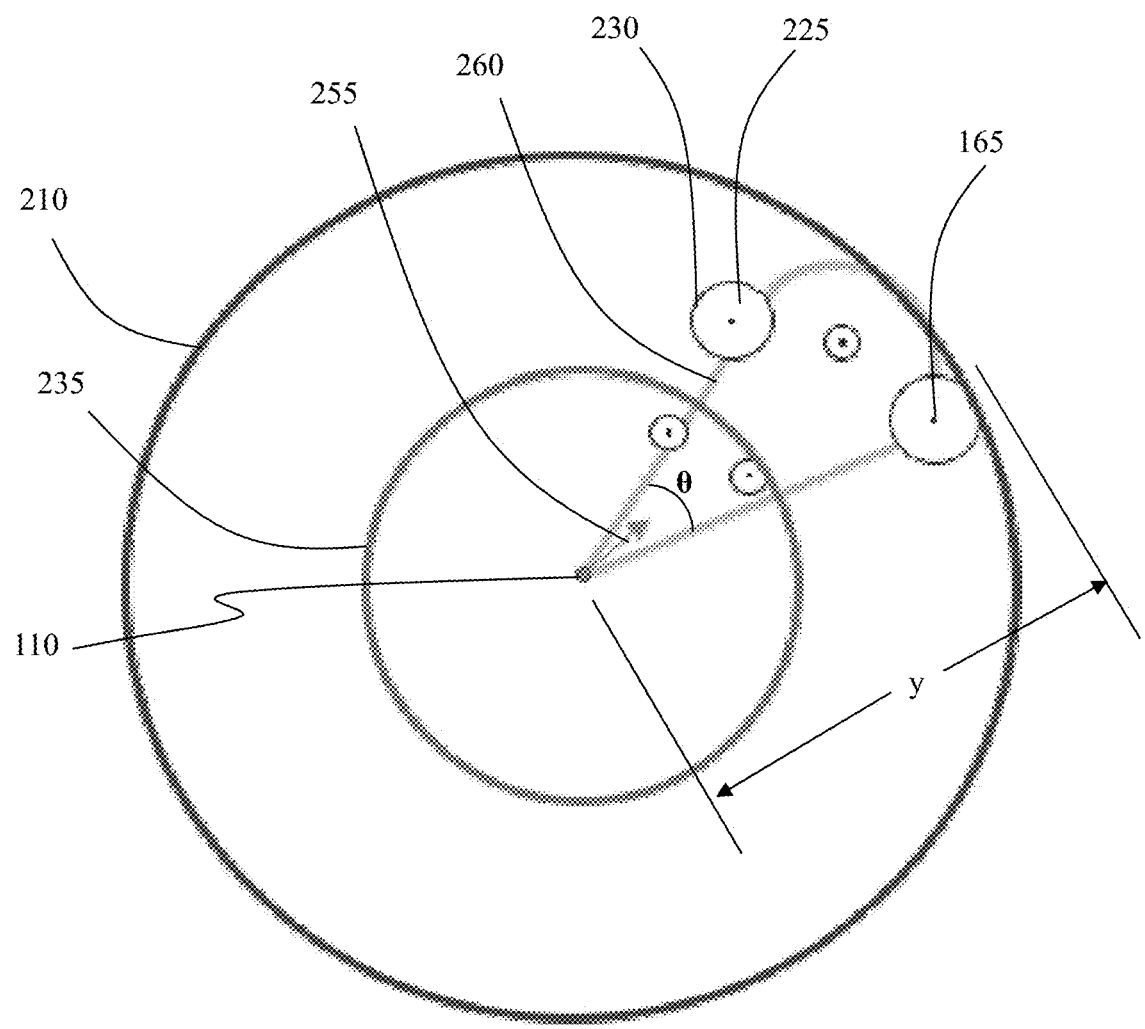
FIG. 5D shows an optimized monitoring of geo-boundaries in accordance with aspects of the invention.

As shown in FIG. 5D, the systems and methods provided herein can be further optimized so that the geo-boundaries 230 moving away from the computing device 110 are ignored while geo-boundaries 230 coming towards the computing device 110 are monitored. This optimization allows for the resources of the computing device 110 to be further preserved by not being wasted on geo-boundaries 230 which the user does not intend to monitor.

More specifically, FIG. 5D illustrates an optimized geo-boundary (also referred to as a prediction zone or "Trajectory Optimized" processes) which optimizes a list of geo-boundaries 230 with respect to a current trajectory 255 of the mobile device 110, e.g., computing device 110. In this implementation, by providing details regarding the computing device 110, e.g., an optimized geo-boundary 260 (e.g., refresh boundary) can be obtained, using the monitored boundary 210 and the original refresh boundary 235. For example, in this implementation, the geo-boundary services application 135 can focus on certain geo-boundaries 230 within the newly created optimized geo-boundary 260 (e.g., refresh boundary), while ignoring other geo-boundaries 230 which would not be of interested to the user based on travel of direction and speed, for example.

As an example using and implementing the optimized geo-boundary 260 (e.g., refresh boundary), the geo-boundary services application 135 can use the current location, speed and direction of travel, e.g., trajectory 255, of the computing device 110 to determine an optimized geo-boundary 260 (e.g., refresh boundary) which certain encompasses geo-boundaries 230 in front and in sides of the computing device 110. In this way, the optimized geo-boundary 260 will exclude certain geo-boundaries 230 that no longer need to be monitored by the moving computing device 110.

As illustrated in FIG. 5D, the optimized geo-boundary 260 can be in the shape of a cone, and can be referred to as a prediction cone. The size and/or shape of the optimized geo-boundary 260 changes in response to the trajectory 255 of the computing device 110. For example, an angle θ can vary based on the speed of the mobile device 110, e.g., a smaller angle θ may be provided with a higher speed of the mobile device 110. Also, as the angle θ decreases, the length "y" of the optimized geo-boundary 260 may increase to maintain an optimal number of geo-boundaries 230 within the optimized geo-boundary 260.

By being modeled as a cone, the angle θ of the optimized geo-boundary 260 can be formulated using a number of variables. The variable "maxAngle" represents an angle of when the computing device 110 is not in motion, and therefore is likely 360 degrees, illustrating a full circle. The variable "minAngle" represents a threshold minimum angle that is allowed, even if the computing device 110 is moving at a relatively high rate of speed. As an example, 30 degrees could be a value for the minAngle, even if the computing device 110 is traveling at a speed of 60 mph. The variable "maxSpeed" represents a max speed at which the minAngle variable should be applied. As an example, 60 mph to 80 mph could be a reasonable value for the maxSpeed. It is noted that even if the computing device 110 is going even faster than the maxSpeed, the value of the minAngle would not be reduced further. The "currentSpeed" variable represents the current speed of the computing device 110. The relationship between these variables is shown as Equation (1) below:

$$\theta = maxAngle - \left((maxAngle - minAngle) \times \left(\frac{currentSpeed}{maxSpeed}\right)\right) \quad (1)$$

As an example of calculating θ, the maxAngle=360 degrees, the minAngle=30 degrees, the maxSpeed=60 mph and the currentSpeed=40 mph. According to Equation (1), θ=360 degrees. Therefore, the prediction cone would be pointed in the direction that the computing device 110 is traveling, but the angle θ of the cone would be 140 degrees instead of a full circle. The calculation of angle θ can be performed by the computer infrastructure 100 of FIG. 1, and more specifically, through the computing device 110 by the geo-boundary services application 135. The variables of maxAngle, minAngle and maxSpeed can be defined by a developer, or could be set in a preference section of the geo-boundary services application 135, depending on the needs of the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:
1. A method comprising:
obtaining a plurality of geographic boundaries from a geographic location of a mobile device;
generating a monitored boundary encompassing the plurality of geographic boundaries;
providing a refresh boundary within the monitored boundary to encompass at least one geographic boundary of the plurality of geographic boundaries;
ranking the plurality of geographic boundaries based on an edge closeness of each geographic boundary with respect to the mobile device;
refreshing the refresh boundary to create a current refresh boundary in response to a user crossing the refresh boundary, the current refresh boundary encompassing highest ranked geographic boundaries based on an edge closeness of the highest ranked geographic boundaries with respect to the mobile device while expelling from the current refresh boundary remaining ranked geographic boundaries which no longer need to be monitored because of being farther edge-wise from the mobile device compared to the highest ranked geographic boundaries; and
encapsulating within a cache boundary the current refresh boundary, the highest ranked geographic boundaries and the remaining ranked geographic boundaries expelled from the current refresh boundary which no longer need to be monitored in order to cache a larger number of the plurality of geographic boundaries compared to the highest ranked geographic boundaries encompassed by the current refresh boundary.
2. The method of claim 1, wherein each geographic boundary is associated with a beacon.
3. The method of claim 2, wherein the mobile device receives metadata from the beacon or a remote sever based on a signal received from the beacon as the mobile device enters the geographic boundary within the refresh boundary.

4. The method of claim 1, wherein the refresh boundary is at least about 50% a size of the monitored boundary.

5. The method of claim 1, wherein the refresh boundary is provided by:
  obtaining a first distance between each geographic boundary and the mobile device in the monitored boundary;
  obtaining a second distance representing a radius of each geographic boundary within the monitored boundary;
  calculating a difference between the first distance and second distance for each geographic boundary; and
  ranking each geographic boundary respect to each other based on the calculated difference.

6. The method of claim 5, wherein a selected number of the highest ranked geographic boundaries are provided in the current refresh boundary which are monitored by the mobile device and the remaining ranked geographic boundaries are provided outside of the current refresh boundary which are not monitored by the mobile device.

7. The method of claim 6, wherein the refresh boundary refreshes automatically when the mobile device is near an outermost geographic boundary of the refresh boundary within the monitored boundary.

8. The method of claim 1, further comprising generating a predicted optimized refresh boundary zone using a speed, direction and current location of the mobile device.

9. The method of claim 1, further comprising performing a remote action based on a signal received from a beacon within the refresh boundary.

10. The method of claim 1, further comprising performing a rules based static action, upon receipt of a signal of a beacon within the refresh boundary, without calling back to a remote server.

11. The method of claim 1, further comprising caching all geographic boundaries within the monitored boundary locally to a storage of the mobile device, and using the geographic boundaries to update the refresh boundary without calling back to a remote server.

12. A computer program product for providing a refresh boundary, the computer program product comprising a computer readable storage medium having program instructions embodied therewith, the program instructions executable by a computing device to cause the computing device to:
  generate a list of geographic boundaries and associated beacons within a geographic area of a mobile device;
  form a monitored border encompassing the listed geographic boundaries and the associated beacons;
  calculate edges of the listed geographic boundaries by finding a first distance extending from the mobile device to a center of each geo-boundary of the listed geographic boundaries, finding a second distance representing a radius of each geographic boundary of the listed geographic boundaries and calculating a difference between the first distance and the second distance for each geographic boundary;
  rank the listed geographic boundaries and associated beacons based on a distance of edge closeness for the calculated edges of the listed geographic boundaries from the mobile device and a size of the geographic boundaries;
  form a refresh boundary based on a number of the ranked geographic boundaries closest to the mobile device;
  refresh the refresh boundary to create a current refresh boundary in response to a user crossing the refresh boundary, the current refresh boundary encompassing highest ranked geographic boundaries based on a distance of edge closeness of the highest ranked geographic boundaries with respect to the mobile device while expelling from the current refresh boundary remaining ranked geographic boundaries which no longer need to be monitored because of being farther edge-wise from the mobile device compared to the highest ranked geographic boundaries; and
  encapsulate within a cache boundary the current refresh boundary, the highest ranked geographic boundaries and the remaining ranked geographic boundaries expelled from the current refresh boundary which no longer need to be monitored in order to cache a larger number of the listed geographic boundaries compared to the highest ranked geographic boundaries encompassed by the current refresh boundary.

13. The computer program product of claim 12, further comprising program instructions executable by the computing device to cause the computing device to send metadata to either the mobile device or the beacon.

14. The computer program product of claim 13, wherein the metadata is an advertisement or an instruction.

15. The computer program product of claim 12, further comprising program instructions executable by the computing device to cause the computing device to predict a zone of coverage encompassing a set of geographic boundaries from the listed geographic boundaries based on a speed and direction of the mobile device.

16. The computer program product of claim 12, further comprising program instructions executable by the computing device to cause the computing device to provide a backend service to the mobile device.

17. The computer program product of claim 12, further comprising program instructions executable by the computing device to cause the computing device to automatically refresh the refresh boundary based on a location of the mobile device within the monitored boundary.

18. A system comprising:
  a CPU, a computer readable memory and a computer readable storage medium associated with a computing device;
  program instructions to generate a monitored boundary encompassing a plurality of beacons and associated geo-boundaries within a predefined geographic area;
  program instructions to form a refresh boundary which includes a predefined number of the plurality of beacons and associated geo-boundaries within the predefined geographic area,
  wherein the refresh boundary is calculated by:
    obtaining a first distance between each geo-boundary and the mobile computing device in the monitored boundary;
    obtaining a second distance representing a radius of each geo-boundary associated with each respective beacon within the monitored boundary;
    calculating a difference between the first distance and second distance;
    ranking the differences from highest to lowest to determine an outermost geo-boundary so that the refresh boundary overlaps the outermost geo-boundary; and
    including a subset or entirety of the highest ranked differences within the refresh boundary based on a number of geo-boundaries which can be monitored by the computing device;
  program instructions to adjust the refresh boundary based on network traffic and resources of the computing device;

program instructions to automatically refresh the refresh boundary to create a current refresh boundary in response to a user crossing the refresh boundary, the current refresh boundary encompassing highest ranked geo-boundaries with respect to the computing device while expelling from the current refresh boundary unranked geo-boundaries which no longer need to be monitored because of being farther edge-wise from the computing device compared to the highest ranked geo-boundaries; and program instructions to encapsulate within a cache boundary the current refresh boundary, the geo-boundaries having the highest ranked differences and the expelled unranked geo-boundaries which no longer need to be monitored in order to cache a larger number of the associated geo-boundaries compared to the geo-boundaries having the highest ranked differences encompassed by the current refresh boundary.

19. The system of claim 18, further comprising program instructions to predict a zone of coverage for the mobile device to monitor based on a location, speed and direction of travel of the mobile.

20. The system of claim 18, further comprising program instructions associated with a remote action to be performed upon receipt of a signal from a beacon within the refresh boundary.

* * * * *